(12) United States Patent
Gaines et al.

(10) Patent No.: US 9,724,686 B2
(45) Date of Patent: Aug. 8, 2017

(54) SULFONATED POLYETHYLENE

(71) Applicant: University of Florida Research Foundation, Inc., Gainesville, FL (US)

(72) Inventors: Taylor W. Gaines, Chandler, AZ (US); Kenneth Boone Wagener, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

(21) Appl. No.: 14/996,632

(22) Filed: Jan. 15, 2016

(65) Prior Publication Data
US 2016/0129436 A1    May 12, 2016

Related U.S. Application Data

(63) Continuation-in-part of application No. PCT/US2014/046592, filed on Jul. 15, 2014.

(60) Provisional application No. 61/846,474, filed on Jul. 15, 2013.

(51) Int. Cl.
| | |
|---|---|
| B01J 39/18 | (2017.01) |
| C08F 8/36 | (2006.01) |
| B01J 39/19 | (2017.01) |

(52) U.S. Cl.
CPC ............. *B01J 39/185* (2013.01); *B01J 39/19* (2017.01); *C08F 8/36* (2013.01)

(58) Field of Classification Search
CPC ............. B01J 39/185; B01J 39/19; C08F 8/36
USPC ....................................................... 521/27
See application file for complete search history.

(56) References Cited

U.S. PATENT DOCUMENTS

| | | | |
|---|---|---|---|
| 5,486,590 A * | 1/1996 | Cabasso ................ | C08G 77/10 525/100 |
| 2004/0005490 A1 * | 1/2004 | Fan ........................ | C08J 5/2231 429/493 |

FOREIGN PATENT DOCUMENTS

| | | |
|---|---|---|
| JP | 2003-303513 | 10/2003 |
| KR | 10-0763895 | 10/2007 |

OTHER PUBLICATIONS

Opper et al. "Precision sulfonic acid ester copolymers", Macromolecular Rapid Communications, vol. 30, No. 11, pp. 915-919.*
Opper et al. "Precision Sulfonic Acid Ester Copolymers", Macromolecular Rapid Communications, 2009, 30, pp. 915-919.*
Baughman, T.W. et al., "Synthesis and Morphology of Well-Defined Poly(ethylene-co-acrylic acid) Copolymers," *Macromolecules*, 2007, pp. 6564-6571, vol. 40.
Boz, E. et al., "Synthesis and Crystallization of Precision ADMET Polyolefins Containing Halogens," *Macromolecules*, 2006, pp. 4437-4447, vol. 39.
Opper, K.L. et al., "Polyethylene Functionalized with Precisely Spaced Phosphonic Acid Groups," *Macromolecules*, 2009, pp. 4407-4409, vol. 42.
Opper, K.L., et al., "Precision Sulfonic Acid Ester Copolymers", *Macromol. Rapid Commun.*, 2009, pp. 915-919, vol. 30.
Opper, K.L., "Polyethylene Functionalized With Highly Polar Groups," *Ph.D. Dissertation*, University of Florida, 2010.
Schwendeman, J.E. et al., "Modeling Ethylene/Methy Methacrylate and Ethylene/Methacrylic Acid Copolymers Using Acyclic Diene Metathesis Chemistry," *Macromolecules*, 2004, pp. 4031-4037, vol. 37.
Seitz, M.E. et al., "Nanoscale Morphology in Precisely Sequenced Poly(ethylene-co-acrylic acid) Zinc Ionomers," *J. Am. Chem. Soc.*, 2010, pp. 8165-8174, vol. 132.

* cited by examiner

*Primary Examiner* — Michael M Bernshteyn
(74) *Attorney, Agent, or Firm* — Saliwanchik, Lloyd & Eisenschenk

(57) ABSTRACT

A sulfonated polyethylene is achieved where a polymethylene backbone with substituted methylene units having one or two sulfonic acid groups or salts of the sulfonic acid groups periodically, quasiperiodically, or quasirandomly separated from each other by unsubstituted methylene units along the polymer backbone. The sulfonated polyethylene is prepared by suspending a sulfonated ester polyethylene in a polar aprotic non-solvent, whereupon the addition of a strong base saponifies the esters with the dissolving of the resulting sulfonated polyethylene having salts of sulfonic acid groups.

11 Claims, 4 Drawing Sheets where x and y are independently 1 to 40, n > 4, and m = 0.01 to 100

SULFONATED POLYETHYLENE

CROSS-REFERENCE TO RELATED APPLICATIONS

This application is a continuation-in-part of International patent application No. PCT/US2014/046592, filed Jul. 15, 2014, which claims the benefit of U.S. Provisional Application Ser. No. 61/846,474, filed Jul. 15, 2013, the disclosures of which are hereby incorporated by reference in their entireties, including all figures, tables and amino acid or nucleic acid sequences.

This invention was made with government support under W911NF-09-1-0290 awarded by the Army Research Office. The government has certain rights in the invention.

BACKGROUND OF INVENTION

Sulfonated polymers that include very strong acid groups or salts of the strong acid within a solid matrix have been used in applications as resins or membranes. Generally these sulfonated polymers are random copolymers, where a non-sulfonated homopolymer is converted by a random reaction into the desired sulfonated copolymer. Sulfonated polystyrene (SPS) has been used for more than seventy years and is widely used for ion-exchange resins and as a polymer bound catalyst. Other common sulfonated polymers are sulfonated polyetheretherketones (SPEEK), sulfonated polyphenylenesulfides (SPPS), and sulfonated polysulfones (SPSU). Common sulfonated aliphatic polymers include Nafion and Hypaln, which are perfluorinated and partially chlorinated polymers. Often the randomly placed highly polar functional groups aggregate in one portion of the structure, and remain aggregated in the environments in which they are used.

As the sophistication of applications for polymers evolves, the need for well-defined polymer microstructures ensues. For these applications, the methods of polymer synthesis must extend beyond the random placement of repeating units common to most chain growth copolymerizations of vinyl monomers, condensation copolymerization, or random polymer reactions. Vinyl copolymerizations, even when perfectly alternating, have significant restrictions to the number of covalently bonded carbon atoms between specific functionalized carbons, almost always three carbon atoms. The homopolymerization of functionalized dienes can also lead the structures equivalent to the alternating copolymerization of vinyl monomers but results with separation of functional groups by only five carbon atoms.

Ring-opening polymerizations of specifically functionalized cycloalkene monomers also give limited possibilities to the placement of specific units on the resulting chains as the ability to prepare a cyclic monomer becomes very difficult and usually prohibitively expensive when the size of the ring exceeds seven or eight atoms.

The ring opening metathesis copolymerization, ROMP, for example, of a carboxylic acid functionalized cyclooctene with cyclooctene and subsequent hydrogenation of the double bounds of the polymer formed upon olefin metathesis to yield polyethylene copolymers with between 2-10 mol % acid groups was achieved by the copolymerization and subsequent hydrogenation of an acid functionalized polymer. These materials were isolated as high-melting, semicrystalline solids, as expected, affording strictly linear materials exhibiting varying levels of crystallinity dependent on comonomer incorporation.

The acyclic diene metathesis polymerization, ADMET, of free acid dienes and protected free acid dienes has been reported, for example, in Schwendeman et al. *Macromolecules* 2004, 37, 4031-37 for ultimate formation of carboxylic acids directly substituted to polyethylene at regular placements and Opper et al. *Macromolecules* 2009, 42, 4407-9 for ultimate formation of phosphoric acids situated regularly along a polyethylene backbone via a phosphoric ester intermediate.

The preparation of a polyethylene substituted with regularly spaced sulfonic acid groups has not been achieved, even though the preparation of the sulfonic ester equivalent of the phosphoric ester that permitted the formation of the regularly substituted phosphoric acid polyethylene has been achieved. A method to prepare a periodic or quasiperiodic sulfonic acid substituted polyethylene would be of value for proton conducting membranes and other devices where the regularity of substitution can allow specific organization without the uncontrolled acid aggregation common to random copolymer systems.

BRIEF SUMMARY

An embodiment of the invention is directed to a sulfonated polyethylene having a polymethylene backbone with substituted methylene units having one or two sulfonic acid groups, or salts of the sulfonic acid groups, where the substituted methylene units are periodically, quasiperiodically, or quasirandomly separated by unsubstituted methylene units along the polymer backbone. The individual methylene units functionalized with sulfonic acid groups or the salts of the sulfonic acid groups are periodically separated from each other by 4 to 41 methylene units. The individual sulfonic acid groups or the salts of the sulfonic acid groups are quasiperiodically, or quasirandomly, separated from each other by an average of x methylene units, wherein x is greater than 4.1. The salts of the sulfonic acid groups are alkali metal salts. The polymer can be a cross-linked resin.

An embodiment of the invention is directed to sulfonated poly($\alpha,\omega$-alkyldiene)s, having a polymethylene backbone with substituted methylene units having one or two sulfonic acid groups, or the salts of the sulfonic acid groups, where subsequent pairs of the substituted methylene units are separated by at least one unsaturated unit and the substituted methylene units are periodically, quasiperiodically, or quasirandomly placed along the polymer backbone.

An embodiment of the invention is directed to a method of preparing a sulfonated polyethylene where a precursor sulfonated ester polyethylene is suspended in a polar aprotic liquid that is a non-solvent for the precursor sulfonated polyethylene to form a suspension that, upon agitating the suspension in the presence of a strong base, converts the sulfonated ester polyethylene suspension into a sulfonic acid salt substituted polyethylene solution. A strong acid can be added to the sulfonated polyethylene comprising the salts of sulfonic acids to convert the salts of sulfonic acids to the sulfonic acids.

DETAILED DISCLOSURE

Figure 1:
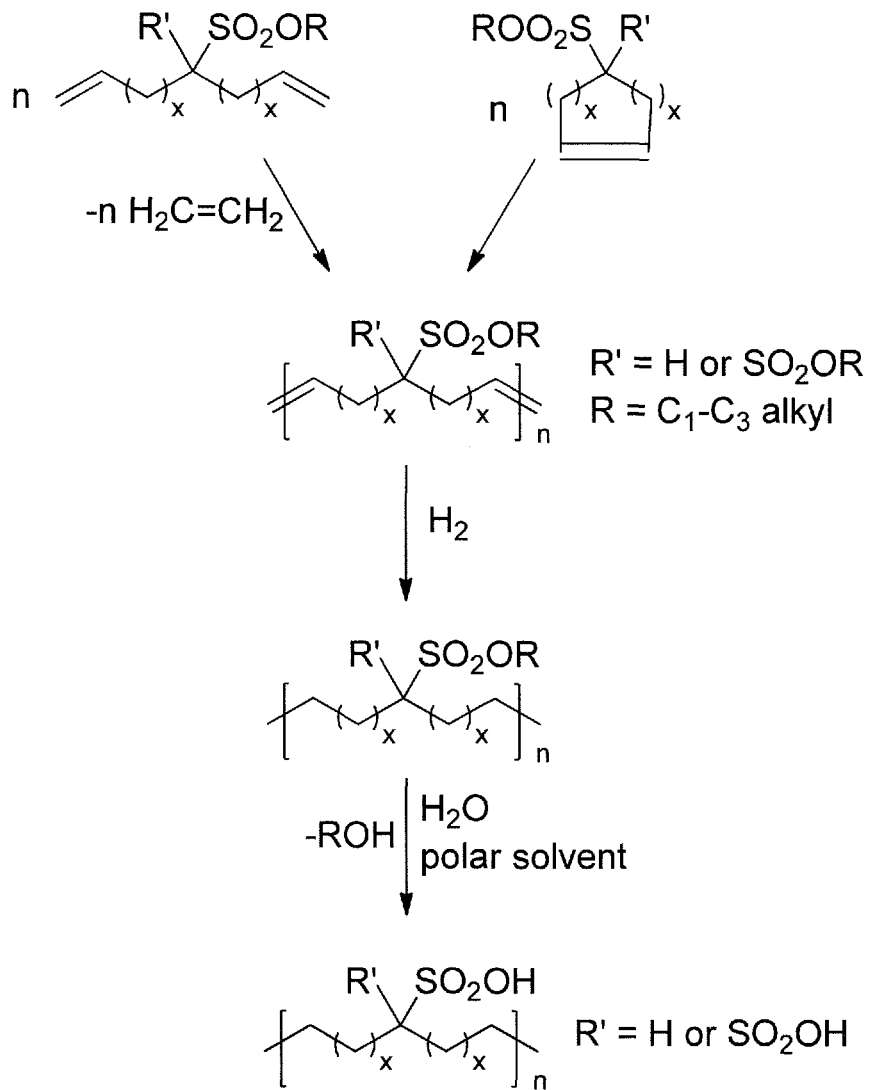
FIG. 1 shows an ADMET polymerization of mono 1-alkoxysulfonyl ester substituted $\alpha,\omega$-diene or a ROMP polymerization of a mono 1-alkoxysulfonyl ester substituted cycloalkene to an unsaturated ester polymer and the subsequent hydrogenation and deprotection to a periodic sulfonic acid polyethylene, according to an embodiment of the invention.

Embodiments of the invention are directed to periodic, quasiperiodic, and quasirandom sulfonic acid or sulfonic acid salt substituted polyethylenes, their preparation, and membranes or other devices therefrom. The preparation of periodic sulfonic acid substituted polyethylenes, according to an embodiment of the invention, is shown in FIG. 1. The sulfonic acid substituted polyethylenes can be prepared by the acyclic diene metathesis (ADMET) polymerization of one or more sulfonic ester substituted α,ω-alkyldienes, where at least one methylene unit separates the terminal ene groups from the sulfonic ester substituted methylene unit, subsequent hydrogenation of the ene units in the resulting polymer, and subsequently the hydrolysis of the sulfonic ester to the sulfonic acid. The ester may be a methyl, ethyl or propyl ester or the ester of any other alcohol or phenol. The polymerization of the monomer can be carried out using any known metathesis catalyst, for example, Schrock's catalyst $(Mo(=CHCMe_2Ph)(N-2,6-C_6H_3-i-Pr_2)(OCMe(CF_3)_2)_2)$, Grubbs' first generation catalyst $(RuCl_2(=CHPh)(PCy_3)_2)$, or Grubbs' second generation catalyst (1,3-bis-(2,4,6-trimethylphenyl)-2-imidazolidinylidene) dichloro(phenylmethylene) (tricyclohexyl-phosphine)ruthenium. Alternatively, ring-opening metathesis polymerization (ROMP) can be performed using one or more sulfonic ester substituted cycloalkenes where at least one methylene unit separates the ene from the methylene with the sulfonic ester substituent. Generally, the cycloalkene is smaller than an eight membered ring, which limits the separation of functional substituents along the chain. With even-numbered ring sizes, the functional group cannot be placed with equi-sized methylene sequences along the chain. Hence, for practical purposes, the seven-membered ring is about the largest functionalized cycloalkene that can result in a periodic placement of functional groups, which leads to a maximum of only six methylene units separating the carbons containing the functional group(s).

Figure 2:
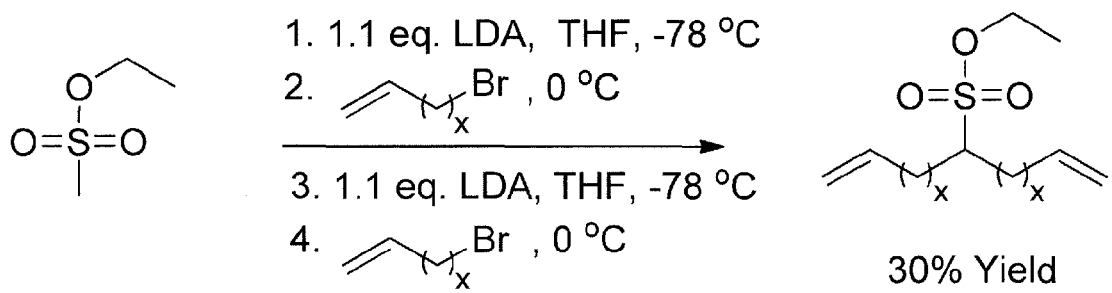
FIG. 2 shows polymerization of a mono alkoxysulfonyl ester substituted α,ω-diene monomer to a poly(alkoxysulfonyl ester substituted α,ω-diene).

The preparation of the sulfonic ester substituted α,ω-alkyldiene monomer can be carried out as shown in FIG. 2, and taught in Opper, K. Polyethylene Functionalized with Highly Polar Groups. Ph.D. Dissertation, University of Florida, 2010, which is incorporated by reference in its entirety. The monomer can be prepared, as shown in FIG. 2, where x is the number of methylene groups in the monoene reagent is the same or different, and is 1 to 20 or more. When x is the same value, the resulting symmetric monomer can be used to prepare a polymer that is periodic.

When x is different, for example, an asymmetric sulfonic ester substituted α,ω-alkyldiene monomer having an x and a y value that are different, a "quasiperiodic" polymer can be formed where the separating methylene units in the substituted polyethylene can be only $2x+2$, $2y+2$, and $x+y+2$ in a 1:1:2 ratio but no other values are possible. Alternatively, by employing two symmetric sulfonic ester substituted α,ω-alkyldiene monomers, one with two x length sequences and one with two y length sequences, or an asymmetric x and y monomer and a symmetric x and x monomer, the repeating units sequences between functionalized methylenes of the ultimate substituted polyethylene can be only $2x+2$, $2y+2$, and $x+y+2$, but the ratio of these units can differ from a 1:1:2 ratio and the longer range order will be different from that where there is a single asymmetric monomer. By tailoring the sequence lengths, for example, where the values of x and y are sufficiently similar, for example, x is about $1.05y$ to about $1.2y$, or the proportion of y sequences is small, the disruption from periodicity may not prohibit a desired organization of the polymer into desired associations of the polymers. For example, in a membrane similar to that using periodic polymers, by promoting defects from periodicity, the processes of organization can be kinetically enhanced by the structural defects with little penalty in the ultimate organized structure.

A "quasirandom" structure can occur where more than two x sequence lengths are employed, for example, x, y and z sequences can be formed when at least two sulfonic ester substituted α,ω-alkyldiene monomers, when at least one is asymmetric, or when three sulfonic ester substituted α,ω-alkyldiene monomers of any type are employed. Inherently, the method employed for preparation of the polymers does not permit a sequence between functionalized methylenes of less than four methylene units, a truly random copolymer is not possible with the monomers described above. Alternatively, di- or poly-sulfonic ester substituted α,ω-alkyldiene monomers could be constructed that could ultimately be combined alone or with sulfonic ester substituted α,ω-alkyldiene monomers to generate what approximates truly random sulfonic acid units on a polyethylene chain.

Figure 3:
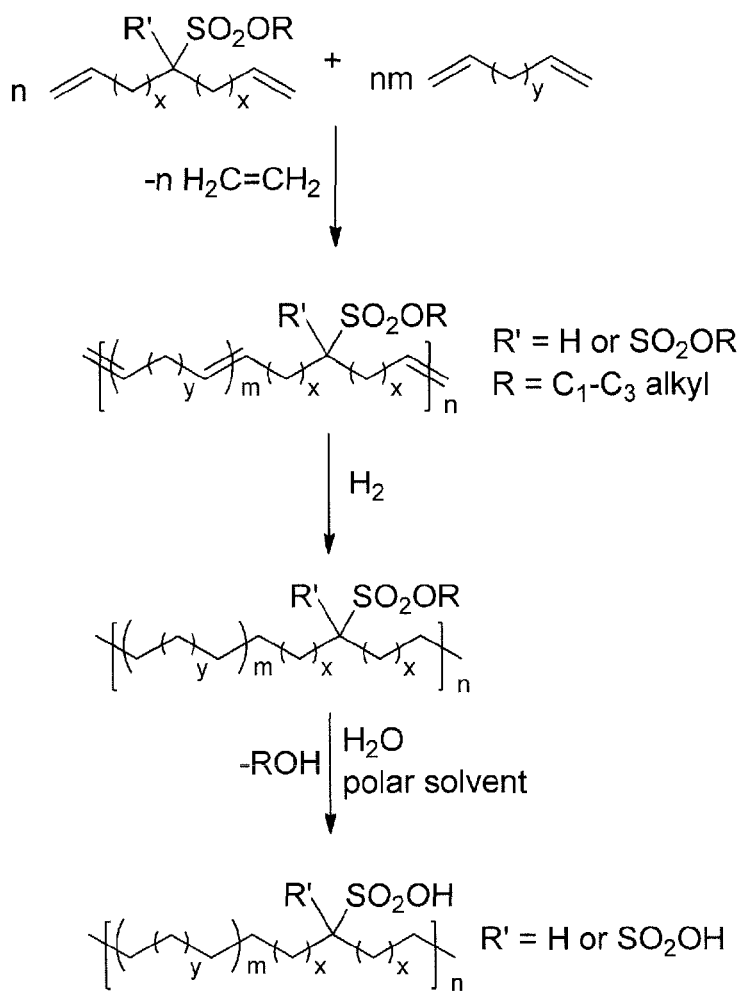
FIG. 3 shows an ADMET copolymerization of mono 1-alkoxysulfonyl ester substituted α,ω-diene and an α,ω-diene to an unsaturated ester copolymer and the subsequent hydrogenation and deprotection to a quasirandom sulfonic acid polyethylene, according to an embodiment of the invention.

In another embodiment of the invention, as shown in FIG. 3, one or more sulfonic ester substituted α,ω-alkyldiene monomers can be copolymerized with one or more α,ω-alkyldiene monomers where the quasirandom sequence lengths between the sulfonic ester substituted methylenes of the sulfonated polyethylene depends upon the proportion and structure of the sulfonic ester substituted α,ω-alkyldiene monomer or monomers and the α,ω-alkyldiene monomers. The sequence length between sulfonic acid substituted methylenes can be no smaller than $2x+2$ methylene units where x is the smallest sequence between the sulfonic ester functional methylenes and the unsaturated units upon polymerization. The larger units can be as high as the statistical maximum number of α,ω-alkyldiene monomers times their length plus $2x+2$.

Figure 4:
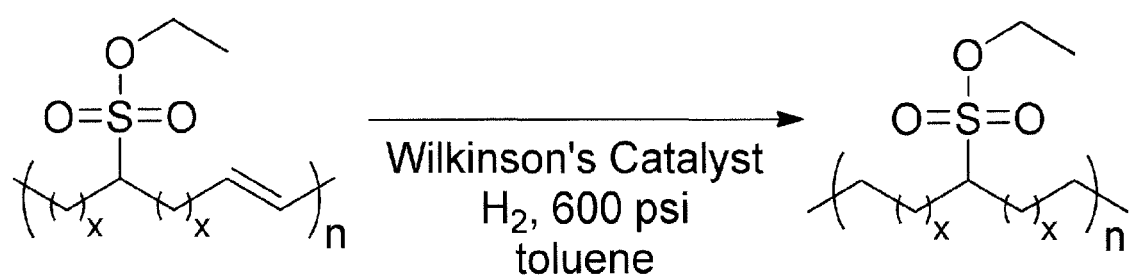
FIG. 4 shows reduction of a poly(alkoxysulfonyl ester substituted α,ω-diene) to a sulfonated ester substituted polyethylene.

After ADMET polymerization, the poly(sulfonic ester substituted α,ω-alkyldiene) is reduced to the sulfonic ester substituted polyethylene. As shown in FIG. 4, the hydrogenation can be carried out in solution in the presence of Wilkenson's catalyst at a high pressure of hydrogen. The reduction is carried out with effectively complete conversion of the olefin. The subsequent conversion of the sulfonic ester to the sulfonic acid or sulfonic salt was resistant to previous efforts to cause this conversion.

Figure 5:
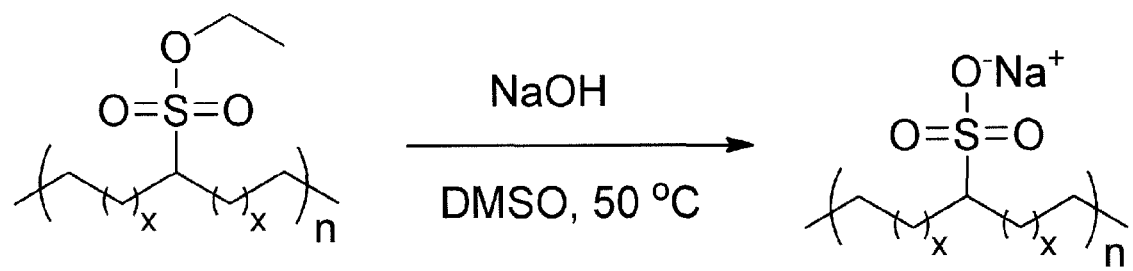
FIG. 5 shows saponification of a sulfonated ester substituted polyethylene to a sulfonic acid salt substituted polyethylene, according to an embodiment of the invention.

It was discovered that by suspending the sulfonic ester substituted polyethylene in a highly polar solvent in the presence of strong base, such as sodium hydroxide, the effective saponification of the ester to a sulfonic acid salt substituted polyethylene results. An advantageous polar solvent is dimethylsulfoxide, DMSO, which has a dipole moment of 3.96 D, a dielectric constant of 47.24, and a pKa of 35. As shown in FIG. 5, the saponification of the ethyl ester proceeds cleanly in DMSO with the dissolving of the sulfonic acid salt substituted polyethylene. This solvent does not dissolve the polyester but dissolves the poly acid. In contrast dimethylformamide (DMF) and dimethylacetamide (DMAc), which has a dipole moment of 3.72 D, a dielectric constant of 37.78, and a pKa of 30, dissolves the ester and reaction results in precipitation without complete saponification.

The sulfonic acid substituted polyethylene can be formed from the acid salt achieved upon saponification. The salt can be the Na, Li, K, Cs, Rb or Fr. The sulfonic acid substituted polyethylene can be converted into a salt upon reaction with a base, where the salt can be of a monovalent, divalent or polyvalent cation. The salt can be a mixture of ions. Alternately, the cations can be organic cations, for example, tetraalkylammonium ions, such as, tetramethylammonium, tetraethylammonium or tetrabutylammonium ions.

Figure 6A:
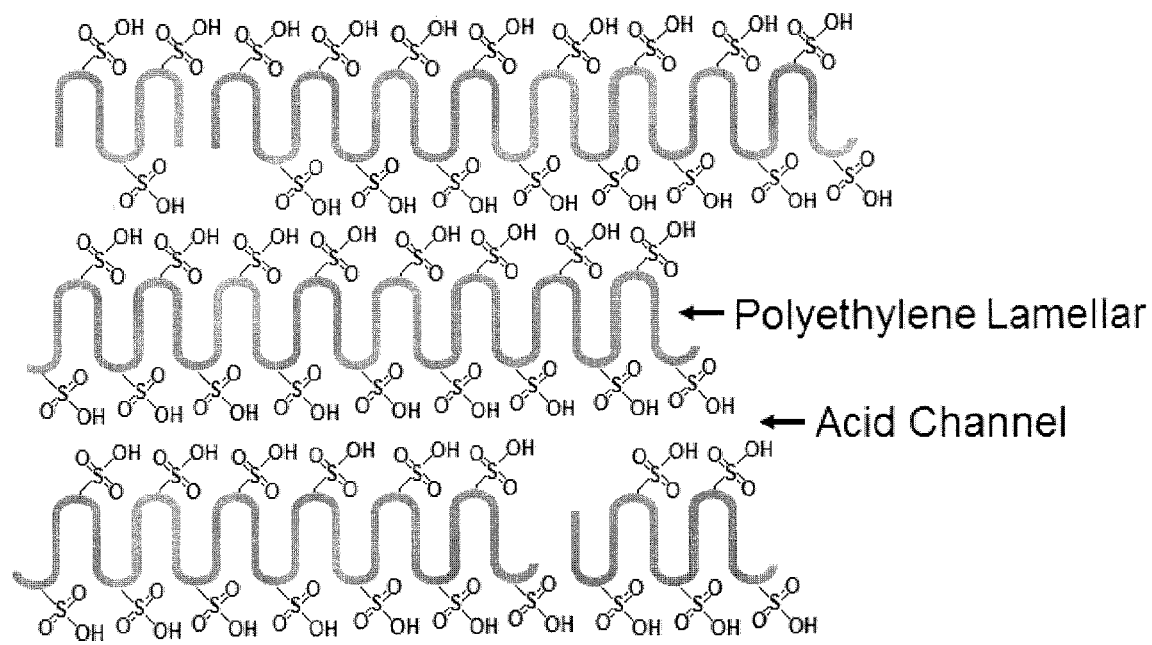
FIG. 6A shows a drawing of a cross-section with an idealizes acid association for an idealized proton conducting membrane having a sulfonic acid substituted polyethylene, according to an embodiment of the invention
Figure 6B:
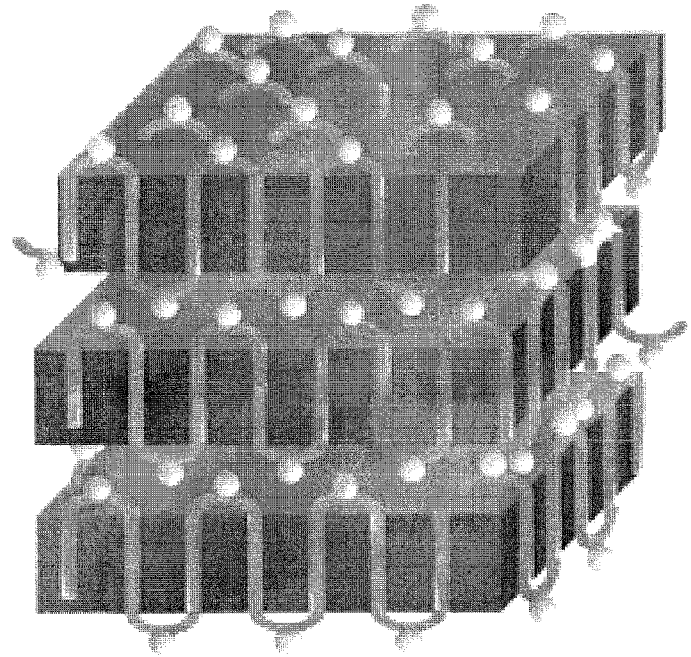
FIG. 6B shows a drawing of a three dimensional projection of the membrane.

Advantageously, the periodic sulfonic acid substituted polyethylene or quasiperiodic sulfonic acid substituted polyethylene can organize into a structure of lamella with acid channels, as illustrated in FIGS. 6A and 6B. In this form the sulfonic acid substituted polyethylene, or a salt thereof, can be employed as a membrane. In the acid form, a proton conducting membrane can be established where a proton can be transported across the membrane by exchange at the sulfonic acid groups of the channels. In the salt form, a membrane has the potential for ion transport. Membranes can be cast from solutions of the sulfonated polyethylene, according to an embodiment of the invention.

The poly(sulfonic ester substituted α,ω-alkyldiene) can be converted to poly(sulfonic acid substituted α,ω-alkyldiene) or poly(sulfonic salt substituted α,ω-alkyldiene) in the manner that the reduced equivalent is formed.

The poly(sulfonic ester substituted α,ω-alkyldiene) can be crosslinked by any method employing an olefin. Crosslinking reactions include, but are not limited to, free-radical reactions, olefin metathesis with triene molecules, epoxidation followed by addition of various hardeners, thiol-ene and other "click" reactions; essentially, any reaction to connect polymer chains through the use of the polymer's double bonds. The reaction of 0.1 to 35% of the double bonds can result in a network for augmentation of the polymer properties. Subsequently, the cross-linked polymer can be hydrogenated and/or hydrolyzed.

Methods and Materials

All $^1$H NMR (300 MHz) and $^{13}$C NMR (75 MHz) spectra were recorded on a Varian Associates Mercury 300 spectrometer. Chemical shifts for 1H and 13C NMR were referenced to residual signals from CDCl$_3$ ($^1$H=7.27 ppm and $^{13}$C=77.23 ppm). Thin layer chromatography (TLC) was performed on EMD silica gel-coated (250 μm thickness) glass plates. Developed TLC plates were stained with iodine adsorbed on silica to produce a visible signature. Reaction progress and relative purity of crude products were monitored by TLC and 1H NMR.

High-resolution mass spectral (HRMS) data were obtained on a Finnegan 4500 gas chromatograph/mass spectrometer using either the chemical ionization (CI) or electrospray ionization (ESI) mode.

Molecular weights and molecular weight distributions were determined by gel permeation chromatography (GPC), performed using a Waters Associates GPCV2000 liquid chromatography system equipped with a differential refractive index detector (DRI) and an autosampler. These analyses were performed at 40° C. using two Waters Styragel HR-5E columns (10 microns PD, 7.8 mm ID, 300 mm length) with HPLC grade THF as the mobile phase at a flow rate of 1.0 mL/minute. Injections were made at 0.05-0.07% w/v sample concentration using a 220.5 μL injection volume. Retention times were calibrated versus narrow molecular weight polystyrene standards (Polymer Laboratories; Amherst, Mass.).

Infrared spectroscopy was obtained using a Perkin-Elmer Spectrum One FT-IR outfitted with a LiTaO3 detector. Samples were dissolved in chloroform and cast on a KBr disc by slow solvent evaporation.

Differential scanning calorimetry (DSC) was performed using a TA Instruments Q1000 at a heating rate of 10° C./min under nitrogen purge. Temperature calibrations were achieved using indium and freshly distilled n-octane while the enthalpy calibration was achieved using indium. All samples were prepared in hermetically sealed pans (4-7 mg/sample) and were run using an empty pan as a reference.

All materials were used as received from Aldrich unless otherwise specified. Tetrahydrofuran (THF) was obtained from an MBraun solvent purification system. Lithium diisopropyl amide (LDA) was prepared prior to monomer synthesis. Grubbs' first generation ruthenium catalyst, bis(tricyclohexylphosphine)benzylidine ruthenium(IV)dichloride, was received from Materia, Inc. Wilkinson's rhodium catalyst, RhCl(PPh$_3$)$_3$, was received from Strem Chemical. Synthesis of synthon 11-bromoheneicosa-1,20-diene was synthesized using the procedure of Boz et al., *Macromolecules* 2006, 39, 4437-47.

Monomer Synthesis

Ethyl tricosa-1,22-diene-12-sulfonate

In a flame dried 3-necked flask equipped with a magnetic stir bar, 2.5 mL (20 mmol, 1 eq) of ethyl methane sulfonate and 4.4 mL (20 mmol, 1 eq) of 11-bromoundecene were stirred in 20 mL of dry THF under argon. After bringing the solution to −78° C., 0.9 eq of LDA was added dropwise over 30 minutes and stirred for 30 additional minutes. The solution was then warmed to 0° C. and stirred for 1 to 2 hours until mono-alkylation was observed and alkenyl bromide disappeared by TLC. After bringing the solution back to −78° C., 0.9 eq of 11-bromoundecene was added slowly and allowed to dissolve. With the solution at −78° C., 0.9 eq of LDA was added dropwise over 30 minutes and stirred for 30 additional minutes. The solution was then warmed to 0° C. and stirred for 2 to 3 hours until the conversion from mono-alkylation to diene product was no longer observed. The reaction was quenched by adding ice cold water. This mixture was then extracted (3×50 mL) with diethyl ether, dried over magnesium sulfate and concentrated to a colorless oil. Column chromatography, using 1:19 diethyl ether:hexane as the eluent, afforded dialkylation product in 30% recovered yield. Substitution of diglyme for THF resulted in a 60% recovered yield. $^1$H NMR (CDCl$_3$): δ (ppm) 1.29 (br, 32H), 1.41 (t, 3H), 2.05 (q, 4H), 2.98 (p, 1H), 4.28 (q, 2H), 4.92-5.03 (m, 4H), 5.75-5.81 (m, 2H). $^{13}$C NMR (CDCl$_3$): δ (ppm) 15.47, 26.83, 29.14, 29.15, 29.33, 29.52, 29.65, 29.70, 61.45, 65.47, 114.35, 139.41. HRMS calcd for $C_{25}H_{48}O_3S$ [M-$C_2H_5$]-(m/z), 399.2901; found, 399.2917. Anal. Calcd for $C_{25}H_{48}O_3S$: C, 70.04; H, 11.29; O, 11.20; S, 7.48 found: C, 69.99; H, 11.33.

Ethyl undeca-1,10-diene-6-sulfonate $^1$H NMR (CDCl$_3$): δ (ppm) 1.39 (t, 3H), 1.56 (m, 4H), 1.65 (m, 2H), 2.05 (m, 2H), 2.12 (q, 4H), 2.98 (p, 1H), 4.28 (q, 2H), 4.97-5.06 (m, 4H), 5.72-5.83 (m, 2H). $^{13}$C NMR (CDCl$_3$): δ (ppm) 15.41, 25.94, 28.52, 33.62, 61.11, 65.58, 115.49, 137.92. HRMS calcd for $C_{13}H_{24}O_3S$ [M+H]+ (m/z), 261.1519; found, 261.1527. Anal. Calcd for $C_{13}H_{24}O_3S$: C, 59.96; H, 9.29; O, 18.43; S, 12.31 found: C, 59.96; H, 9.40.

Alternate Monomer Synthesis

To a three-neck round bottom flask, 5.00 grams (40.27 mmols) of ethyl methanesulfonate was dissolved in 40 mL of dry THF. The solution was cooled to −78° C., approximately 39 mmols of freshly prepared LDA was added dropwise, and the solution stirred for 15 minutes. The temperature was raised to 0° C. for 30 minutes to allow for thorough deprotonation. The flask was then lowered again into a −78° C. bath and stirred for 15 minutes before 39 mmols of the appropriate triflate was added dropwise in 50 mL of dry heptane. The reaction was raised to 0° C. for 30 minutes and then lowered back to −78° C. before repeating the addition of LDA and triflate once more to yield dialkylated product. Afterwards, the reaction was concentrated to half the original volume, flooded with deionized water, and extracted with diethyl ether (4×25 mL). The organic layer was collected and dried over MgSO$_4$. The MgSO$_4$ was filtered, washed with ether, and discarded, while the filtrate was collected and concentrated to yield crude oil-like products. Products were purified via column chromatography with an eluent mixture consisting of hexanes and ethyl acetate (19:1).

Ethyl undeca-1,10-diene-6-sulfonate

To 8.51 grams of pent-4-en-1-yl trifluoromethanesulfonate was added after each deprotonation. Yield: 4.57 grams, 45%. $^1$H NMR (300 MHz, CDCl$_3$) δ 5.83-5.74 (m, 2H), 5.07-4.96 (m, 4H), 4.32-4.25 (q, 2H), 2.99-2.97 (p, 1H), 2.13-2.05 (q, 4H), 1.98-1.88 (m, 4H), 1.75-1.53 (m, 4H), 1.42-1.37 (t, 3H). $^{13}$C NMR (75 MHz, CDCl$_3$) δ 137.7, 115.3, 65.4, 60.9, 33.4, 28.3, 25.7, 15.2. HRMS (ESI) (m/z): (M+Na)$^+$ calcd for $C_{25}H_{48}O_3S$, 451.3216; found 451.3213. Elemental Analysis: calcd for $C_{25}H_{48}O_3S$, C: 70.04, H: 11.29, N: 0.00; found C: 69.84, H: 11.55, N: 0.00.

Ethyl tricosa-1,22-diene-12-sulfonate

To 11.78 grams of undec-10-en-1-yl trifluoromethanesulfonate was added after each deprotonation. Yield: 6.79 grams, 40%. $^1$H NMR (300 MHz, CDCl$_3$) δ 5.85-5.74 (m, 2H), 5.01-4.91 (m, 4H), 4.31-4.24 (q, 2H), 2.98-2.94 (p, 1H), 2.07-1.97 (q, 4H), 1.95-1.85 (m, 4H), 1.74-1.62 (m, 4H), 1.54-1.28 (br, 27H). $^{13}$C NMR (75 MHz, CDCl$_3$) δ 139.2, 114.1, 71.9, 65.3, 61.2, 33.8, 29.5, 29.4, 29.3, 29.1, 28.9, 28.9, 26.6, 15.2. HRMS (ESI) (m/z): (M+NH$_4$)$^+$ calcd for $C_{13}H_{24}O_3S$, 278.1784; found 278.1786. Elemental Analysis: calcd for $C_{13}H_{24}O_3S$, C: 59.96, H: 9.29, N: 0.00; found C: 60.23, H: 9.42, N: 0.00.

Homopolymerization

In a flame dried 50 mL round bottom flask, an exact amount of monomer was weighed. Using a 400:1 monomer:catalyst ratio (0.25 mol %), Grubbs' first generation catalyst was added and mixed into the monomer while under a blanket of argon. A magnetic stir bar was placed into the mixture while a Schlenk adapter was fitted to the round bottom. After sealing the flask under argon it was moved to a high vacuum line. The mixture was stirred and slowly exposed to vacuum over an hour at room temperature. After stirring for an hour at room temperature under eventual high vacuum (10-3 torr), the flask was lowered into a pre-warmed 50° C. oil bath for an appropriate number of days allowing removal of ethylene bubbling through viscous polymer. Polymers were quenched by dissolution of polymer in an 1:10 ethyl vinyl ether:toluene solution under argon. Upon precipitation into an appropriate solvent, the polymers were isolated.

Polymerization of Ethyl tricosa-1,22-diene-12-sulfonate $^1$H NMR (CDCl$_3$): δ (ppm) 1.29 (br, 32H), 1.41 (br, 3H), 1.96 (br, 4H), 2.97 (p, 1H), 4.29 (q, 2H), 5.39 (br, 2H). $^{13}$C NMR (CDCl$_3$): δ (ppm) 15.47, 26.85, 27.46, 29.16, 29.42, 29.57, 29.65, 29.71, 29.74, 29.91, 30.01, 32.84, 61.46, 65.49, 130.56. GPC data (THF vs. polystyrene standards): Mw=63,900 g/mol; P.D.I. (Mw/Mn)=1.8.

Polymerization of Ethyl undeca-1,10-diene-6-sulfonate $^1$H NMR (CDCl3): δ (ppm) 1.40 (t, 3H), 1.51 (m, 4H), 1.67 (m, 2H), 1.90 (m, 2H) 2.05 (m, 4H), 2.98 (p, 1H), 4.29 (q, 2H), 5.41 (m, 2H). $^{13}$C NMR (CDCl3): δ (ppm) 15.47, 26.60, 26.72, 27.26, 28.62, 29.67, 32.52, 61.17, 65.68, 129.80, 130.33. GPC data (THF vs. polystyrene standards): Mw=22,700 g/mol; P.D.I. (Mw/Mn)=2.1.

Alternate Polymerization

Monomer solutions in CH$_2$Cl$_2$ (2.0M) in dry Schlenk tubes were subjected to freeze-pump-thaw cycles until gas evolution failed to appear. A final freeze was performed and while under argon purge, 1 mol % of Grubbs' first generation catalyst was added. The Schlenk tubes were equipped with a reflux condenser and argon flow adapter. The apparatus was placed in an oil both at the appropriate temperature to maintain reflux. Polymerizations were continued, the mixture was cooled, and a solution of ethyl vinyl ether in toluene (1:10) was added to the tube. The polymers were then precipitated from methanol at about −18° C. and subsequently the polymer isolated by filtration and dried under vacuum.

Polymerization of Ethyl tricosa-1,22-diene-12-sulfonate

Using the above procedure, polymerization of ethyl tricosa-1,22-diene-12-sulfonate proceeded for 72 hours. $^1$H NMR (300 MHz, CDCl$_3$) δ 5.39-5.34 (br, 2H), 4.31-4.23 (q, 2H), 2.98-2.94 (p, 1H), 2.02-1.85 (m, 4H), 1.73-1.61 (m, 4H), 1.49-1.24 (br, 27H). $^{13}$C NMR (75 MHz, CDCl$_3$) δ 130.3, 65.3, 61.2, 32.6, 29.7, 29.5, 29.5, 29.5, 29.3, 29.2, 28.9, 26.6, 15.2. FT-IR (ATR) ν in cm$^{-1}$ 2922, 2852, 1645, 1464, 1342, 1167, 1095, 1005, 967, 912, 768, 721, 628. GPC (THF, Polystyrene Standards): $M_n$=33,300; $M_n$=73,600 (PDI=2.21).

Copolymerization of Ethyl undeca-1,10-diene-6-sulfonate and 1,9-decadiene

A mixture of 1.664 grams of ethyl undeca-1,10-diene-6-sulfonate and 1.328 grams of 1,9-decadiene were polymerized for 72 hours using the above procedure. $^1$H NMR (300 MHz, CDCl$_3$) δ 5.48-5.5.30 (br, 4H), 4.31-4.24 (q, 2H), 3.02-2.96 (p, 1H), 2.17-1.86 (br, 8H), 1.78-1.61 (br, 4H), 1.59-1.45 (m, 4H), 1.42-1.25 (br, 11H). $^{13}$C NMR (75 MHz, CDCl$_3$) δ 131.5, 130.3, 128.9, 65.3, 61.0, 32.6, 32.3, 29.6, 29.0, 28.3, 27.2, 26.4, 15.2. FT-IR (ATR) ν in cm$^{-1}$ 2923, 2852, 1457, 1342, 1166, 1004, 966, 912, 763, 703. GPC (THF, Polystyrene Standards): $M_n$=2,200; $M_n$=3,200 (PDI=1.45).

Hydrogenation

Polymers and copolymers were dissolved in toluene and degassed by bubbling nitrogen through the stirred solution for an hour. Wilkinson's catalyst [RhCl(PPh$_3$)$_3$] was added to the solution along with a magnetic stir bar, and the glass sleeve was sealed in a Parr reactor equipped with a pressure gauge. The reactor was filled to 700 psi hydrogen gas and purged three times while stirring, filled to 500 psi hydrogen, heated using an oil bath to 90° C. and stirred for approximately five days. After degassing, the crude solution was isolated, and delivered into an appropriate solvent for precipitation of the polymer.

Hydrogenation to Yield poly(ethyl tricosyl-12-sulfonate)

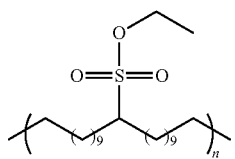

$^1$H NMR (CDCl$_3$): δ (ppm) 1.29 (br, 41H), 1.41 (br, 3H), 2.97 (p, 1H), 4.29 (q, 2H); $^{13}$C NMR (CDCl$_3$): δ (ppm) 15.45, 26.82, 29.13, 29.55, 29.72, 29.78, 29.85, 29.94, 61.44, 65.48; FT-IR (ATR) ν in cm$^{-1}$ 2916, 2849, 1467, 1342, 1165, 1099, 1003, 913, 772, 720.

Hydrogenation to Yield poly(ethyl undecyl-6-sulfonate)

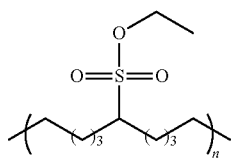

$^1$H NMR (CDCl$_3$): δ (ppm) 1.38 (br, 12H), 1.40 (t, 3H), 1.69 (m, 2H), 1.90 (m, 2H), 2.98 (p, 1H), 4.29 (q, 2H); $^{13}$C NMR (CDCl$_3$): δ (ppm) 15.41, 25.94, 28.52, 33.62, 61.11, 65.58; FT-IR (ATR) ν in cm$^{-1}$ 2921, 2852, 1638, 1464, 1340, 1261, 1164, 1096, 1003, 910, 767, 701, 628.

Hydrogenation to Yield poly(ethyl undecyl-6-sulfonate-co-1,9-decadiene)

$^1$H NMR (300 MHz, CDCl$_3$) δ 4.28-4.21 (q, 2H), 2.95-2.91 (p, 1H), 1.90-1.82, (m, 4H), 1.68-1.61 (m, 4H), 1.44-1.33 (t, 3H), 1.29-1.06 (br, 24H); $^{13}$C NMR (75 MHz, CDCl$_3$) δ δ 65.2, 61.1, 34.3, 29.6, 29.4, 29.3, 28.8, 26.5, 15.2; FT-IR (ATR) ν in cm$^{-1}$ 2917, 2849, 1463, 1342, 1262, 1167, 1096, 1005, 912, 768, 729, 720.

Saponification

Individually, the polymers were suspended in DMSO and solid NaOH was added with stirring. Over time the polymers dissolved with the release of ethanol to form poly(sodium tricosyl-12-sulfonate) or poly(sodium undecyl-6-sulfonate).

Alternatively, refluxing sodium methoxide and ethanol quantitatively saponify polymers dissolved and/or sustended in the ethanol. Sodium methoxide nucleophilic attack on the ether ester produced methoxyethane as the by-product. After 72-hours the sodium salt polymers were isolated, where there was no trace of ester by analysis of the IR signal for the sulfonate ester.

All publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A sulfonated polyethylene, comprising a polymethylene backbone with substituted methylene units having one or two salts of sulfonic acid groups wherein the salts of the sulfonic acid groups are alkali metal salts, and wherein the substituted methylene units are periodically, quasiperiodically, or quasirandomly separated by a plurality of unsubstituted methylene units along the polymer backbone.

2. The sulfonated polyethylene of claim 1, wherein the individual methylene units functionalized where the salts of the sulfonic acid groups are periodically separated from each other by x methylene units, wherein x is 4 to 40 or more.

3. The sulfonated polyethylene of claim 1, wherein the individual salts of the sulfonic acid groups are quasiperiodically, or quasirandomly separated from each other by an average of x methylene units, wherein x is 4.1 to 40 or more.

4. The sulfonated polyethylene of claim 1, wherein the salts of the sulfonic acid groups are monovalent, divalent, or polyvalent metal salts.

5. The sulfonated polyethylene of claim 1, wherein the polymer is cross-linked.

6. A sulfonated poly(α,ω-alkyldiene), comprising a polymethylene backbone with substituted methylene units having one or two salts of the sulfonic acid groups, wherein subsequent pairs of the substituted methylene units are separated by at least one unsaturated unit and the substituted methylene units are periodically, quasiperiodically, or quasirandomly placed along the polymer backbone.

7. The sulfonated poly(α,ω-alkyldiene) of claim 6, wherein more than one unsaturated units reside between the substituted methylene units along the polymer backbone.

8. A method of preparing a sulfonated polyethylene according to claim 1, comprising:

providing a precursor sulfonated ester polyethylene comprising a polymethylene backbone with substituted methylene units having one or two sulfonic ester groups, wherein the substituted methylene units are periodically, quasiperiodically, or quasirandomly separated by at least four unsubstituted methylene units along the polymer backbone;

suspending the precursor sulfonated ester polyethylene in a polar aprotic liquid that is a non-solvent for the precursor sulfonated polyethylene to form a suspension;

adding a strong base to the suspension, and
agitating the suspension with the strong base until the suspension is converted into a solution, wherein the solution comprises a sulfonated polyethylene where the sulfonated groups are the salts of sulfonic acids.

9. The method of claim 8, wherein the polar aprotic liquid is DMSO.

10. The method of claim 8, further comprising adding a strong acid to the sulfonated polyethylene comprising the salts of sulfonic acids to convert the salts of sulfonic acids to sulfonic acids.

11. A membrane, comprising a sulfonated polyethylene according to claim 1.

* * * * *

UNITED STATES PATENT AND TRADEMARK OFFICE
CERTIFICATE OF CORRECTION

PATENT NO. : 9,724,686 B2
APPLICATION NO. : 14/996632
DATED : August 8, 2017
INVENTOR(S) : Taylor W. Gaines et al.

Page 1 of 1

It is certified that error appears in the above-identified patent and that said Letters Patent is hereby corrected as shown below:

In the Specification

Column 8,

Line 28, "$^1$H NMR (CDCl3)" should read --$^1$H NMR (CDCl$_3$)--.
Line 30, "$^{13}$C NMR (CDCl3)" should read --$^{13}$C NMR (CDCl$_3$)--.

Column 9:

Line 2, "5.48-5.5.30" should read --5.48-5.30--.
Line 55, "$^1$H NMR (CDCl-$_3$)" should read --$^1$H NMR (CDCl$_3$)--.
Line 67, "δ δ 65.2" should read --δ 65.2.--.

Signed and Sealed this
Thirty-first Day of July, 2018

Andrei Iancu
*Director of the United States Patent and Trademark Office*